Jan. 4, 1927.
E. L. KULICK
1,613,397
BRAKE MECHANISM FOR AUTOMOBILES
Filed April 29, 1925      2 Sheets-Sheet 1
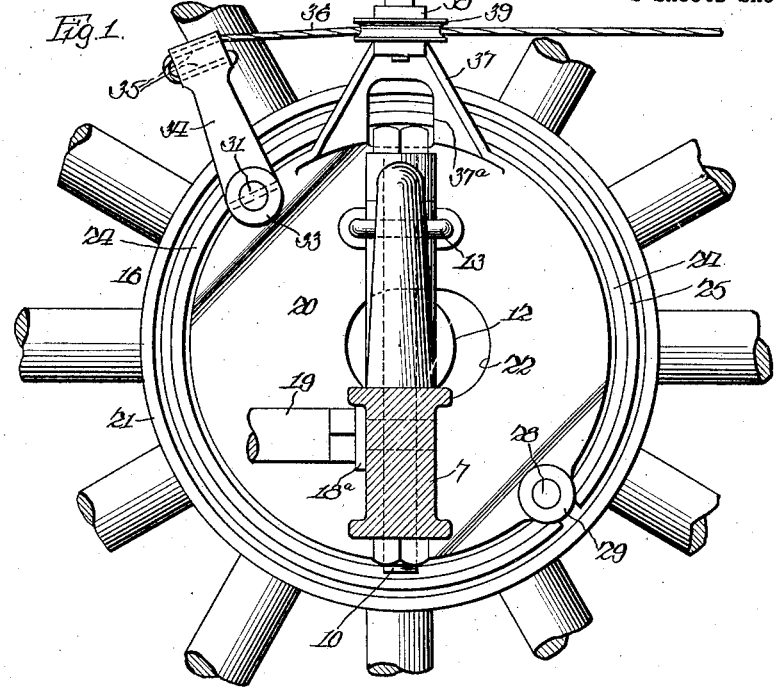
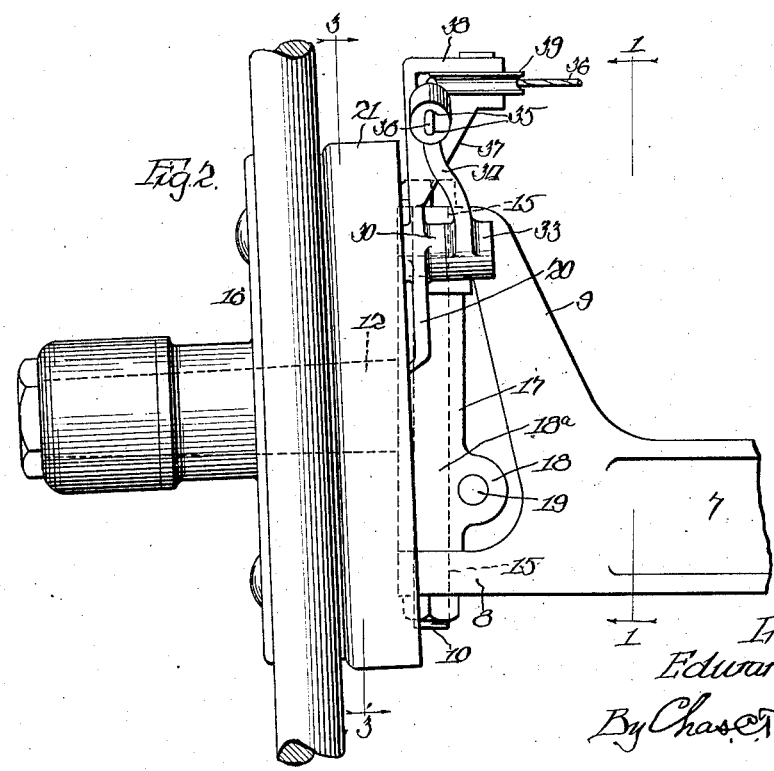
Inventor
Edward L. Kulick
By Chas. E. Tillman
Atty.

Jan. 4, 1927.
E. L. KULICK
1,613,397
BRAKE MECHANISM FOR AUTOMOBILES
Filed April 29, 1925    2 Sheets-Sheet 2
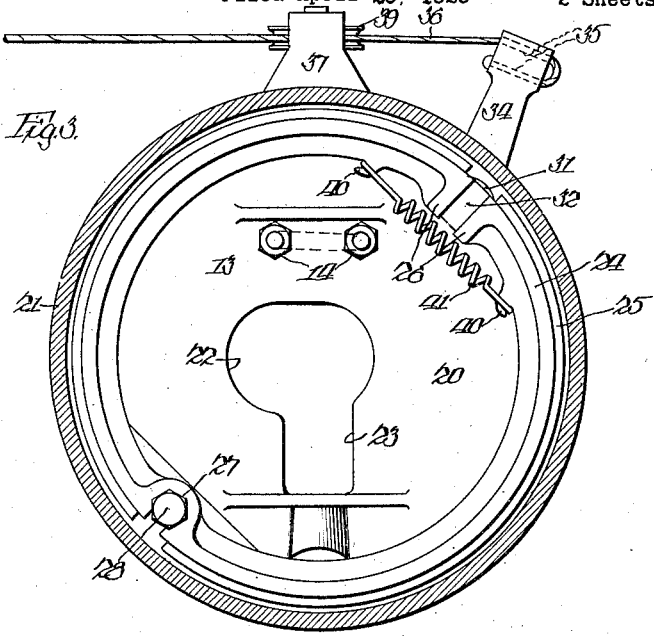
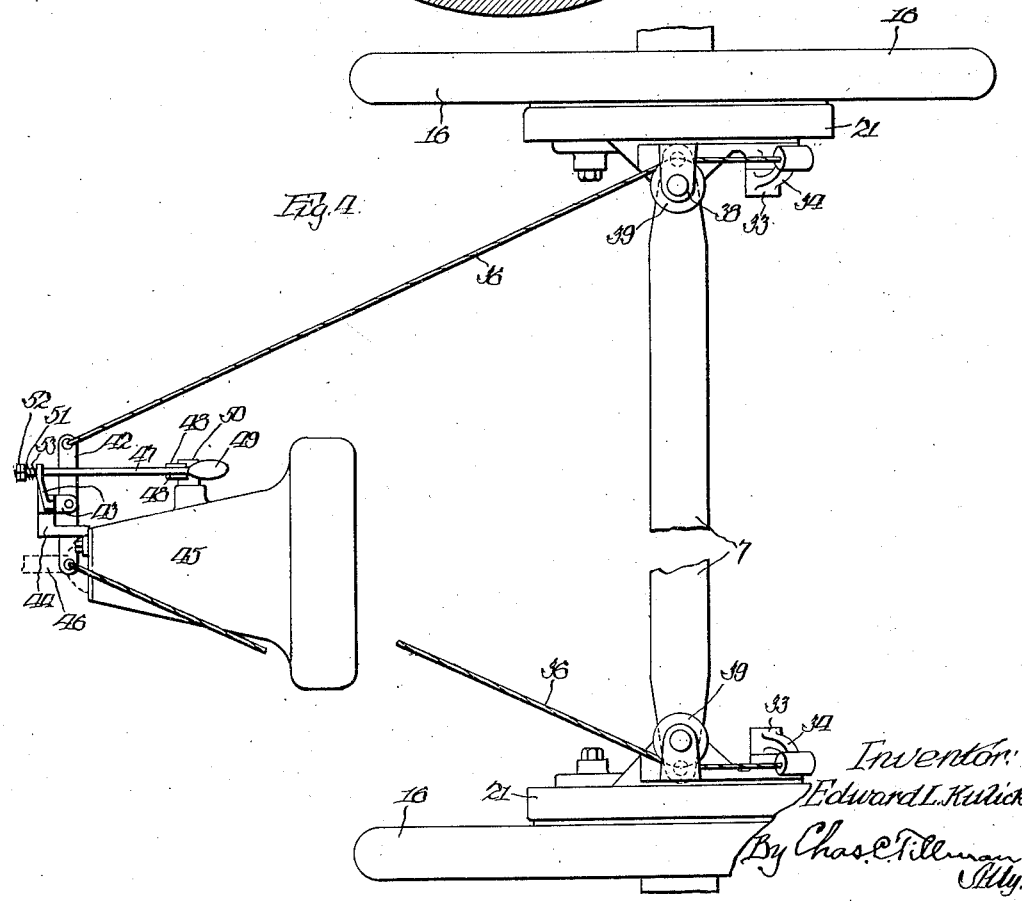
Inventor:
Edward L. Kulick
By Chas. E. Tillman
Atty.

Patented Jan. 4, 1927.

1,613,397

UNITED STATES PATENT OFFICE.

EDWARD L. KULICK, OF CHICAGO, ILLINOIS.

BRAKE MECHANISM FOR AUTOMOBILES.

Application filed April 29, 1925. Serial No. 26,622.

This invention relates, generally, to brakes and particularly to a brake mechanism for automobiles of a type employing a planetary system of power transmission including therein a brake mechanism, with which my improvements are associated and co-operate to accomplish certain beneficial results as will be hereinafter disclosed.

As the Ford type of automobile employs power transmitting means of the above mentioned character, I have, while not restricting the invention thereto in its application or use, except where so specified in the annexed claims, shown, and will hereinafter describe the invention as embodied in an automobile of the Ford type sufficient parts thereof only being illustrated in the drawings and referred to in the following description and explanation to furnish a clear and full understanding thereof.

My present invention embodies improvements on or over the structure disclosed in my application Serial No. 749,422, filed November 12th, 1924, for Letters Patent for improvements in a brake mechanism for automobiles, and has among its objects similar ones to those set forth in my aforesaid application, to wit; the provision of a brake mechanism incorporated in the structure of an automobile having a planetary system of power transmission including therein braking means, so associated with said transmission means and the front wheels of the vehicle, as to furnish what may be termed, a three-point brake, whereby the quivering or vibratory effect and the consequent chattering noise incident to the application of the brake mechanism in the said transmission means, commonly called "the service brake" of a Ford automobile, will be eliminated, or reduced to a minimum.

Another object is, the provision of means in a structure of the above named kind, whereby the brake bands or elements therefor for the front wheels of the vehicle will be applied with yielding pressure, thus obviating abrupt or too sudden stopping of the vehicle and thus preventing its tendency to rise at its rear portion from the ground when stopped.

In addition to the above named objects, my present invention contemplates the provision of a brake mechanism, much simpler in construction, less expensive to manufacture and install and more satisfactory and efficient in its operation, than that of my aforesaid application or any other of which I am aware.

Other objects and advantages of the invention will be disclosed in the following description and explanation, which will be more readily understood when read in conjunction with the accompanying drawings, in which—

Fig. 1, is an inner face view partly in section of one of the front wheels of an automobile, taken on line 1, 1 of Fig. 2 showing said wheel equipped with the improvements of the present invention.

Fig. 2, is a view in elevation of said wheel and parts looking from a point rearwardly thereof.

Fig. 3 is a sectional view taken on line 3, 3 of Fig. 2 looking in the direction indicated by the arrows, showing the opposite side of the dust plate of said wheel from that shown in Fig. 1 and Fig. 4 is a plan view of the front portion of an automobile equipped with the improvement.

Like numerals of reference designate corresponding parts throughout the different views of the drawings.

The reference numeral 7 designates the front axle of the vehicle, which axle is shown as being of the Ford type and has at each of its ends an outward extension 8, and an upwardly and outwardly disposed extension or arm 9, in the outward portion of each pair of which is a pivot pin 10, for the pivotable support of one of the spindles 12, mounted in the ordinary way. The dust plate is secured by a U-bolt 13 which is extended through suitable openings in the upper portion of said dust plate to the hollow body 17 surrounding the pin 10 and said U-bolt is fixed removably in position by the nuts 14.

The upper extremity of each of the arms 9, as well as the outer portion of each of the extensions 8, is provided with a vertical opening 15 for the reception of the pins 10, the heads of which pins rest on the upper surface of said arms. As usual, each of the spindles 12 for the front wheels 16 of a Ford automobile is provided at its inner end with a hollow body 17, located between the upper end of the arm 9 and the upper surface of the extension 8 at each end of the front axle for co-operation with the pivot pins 10 so as to permit pivotal movement of the front wheels with respect to said axle in steering the vehicle.

At least one of these bodies 17, is provided near its lower end with an apertured lug 18 to register with a similar lug 18ª on the dust plate, designated as a whole by the numeral 20, through which openings the speedometer connection 19, is extended and threaded therein at one of its ends in a well known way.

Each of the front wheels 16, is provided on its inner surface concentrically with respect to the spindle 12 on which the wheel is mounted, with a brake drum 21, preferably in the form of an annulus.

Located in each of the drums 21, but spaced at its periphery therefrom is one of the dust plates 20, each of which is provided centrally therein with a horizontally elongated opening 22, having depending slot 23, to permit of the easy insertion of the spindles of the wheels and for ready adjustment of the said plate with respect to the drum and other elements of the mechanism.

Mounted on the outer surface of each of the plates 20, and surrounding its periphery between the latter and the drum 21, is a broken or split brake-band 24, having a peripheral lining 25, to contact with the inner surface of the brake-drum when said band is expanded. The band 24 is by preference of a single resilient piece as shown in Figs. 1 and 3, and has diametrically opposite its brake, or ends 26, an inwardly bent portion 27, which provides a bearing for a securing bolt 28, extended therethrough and engaging a socketed boss 29 arranged at a suitable point on the inner surface of the dust plate, by which arrangement it will be seen that said band and plate will be securely fastened together yet so as to permit expansion of the band. On its inner surface and about diametrically opposite the boss 29, the plate 20, is provided with another apertured boss, 30, see Fig. 2 which provides a bearing for a rock-shaft 31 which has at its inner end a member 32 extended between the ends 26 of the band and used for separating them to cause the expansion of the band and its lining against the brake drum. Fixed to the shaft 31 on its inner portion is the hub 33 of an upwardly and outwardly disposed arm 34 which has near its outer end a pair of openings 35, which afford convenient means for securing one end of a cable 36 thereto by looping the cable therein as shown.

Each of the plates 20, is provided at its top with an upwardly extended bracket 37, and each of said brackets has a horizontally disposed and slotted hanger 38 for a pulley 39 with which the cables 36 co-operate.

It will be understood by reference to Fig. 1, that each of the brackets 37, has a cut-away portion or slot 37ª directly above the head of each of the pins 10, to permit of their removal, and by reference to Figs. 2 and 4, that each pulley 39 is so journaled in its hanger that its point of contact with the co-operating cable 36 will be directly above the vertical axis of the pin 10 thereunder.

The brake band 24 has on its inner periphery on each side of its ends 26 a hook 40 to which are fastened the ends of a coil spring 41, used to assist in restoring said band to its normal position after being expanded.

Referring now more particularly to Fig. 4, it will be seen that each of the cables 36 is connected at its rear end to the equalizing bar 42, which bar is pivotally mounted at its middle on the lower portion of an upright lever 43 fulcrumed to a bracket 44 extended rearwardly from the transmission casing 45, which casing is supported in a well known way on the frame of the vehicle and has extended therefrom the driving shaft 46 which is operatively connected for driving purposes to the automobile in a well known way. The lever 43 which carries the equalizer bar 42 is vertically mounted and fulcrumed on the bracket 44 and has in its upper end an opening through which a rod 47 is slidably and horizontally extended above and slightly to one side of the transmission casing. One end of the rod 47 is pivotally connected to an arm or a pair of links 48 secured at one of their ends to the foot lever 49 used for applying the service brake or brake mechanism of the planetary power transmission located within the casing 45, which lever is fixed at its lower end to a shaft 50 extended through one side of the said casing and operatively connected within the casing to the said brake mechanism. The rod 47 has mounted on its free end an adjusting nut 51, and a lock nut 52, therefor which are employed to regulate the tension of a spring 53, mounted around the rod 47 and interposed between the nut and the upper end of the lever 43, as is clearly shown in Fig. 4 of the drawing.

From the foregoing and by reference to the drawings it will be readily understood and clearly seen that, assuming it is desired to check, retard, or stop the vehicle, it is only necessary to apply foot pressure to the foot lever 49 of the service brake, in which operation it is obvious that said lever will move forwardly or towards the front axle, thus causing through the instrumentality of the connecting rod 47 and the spring 53 thereon the upper portion of the lever 43 to be moved forwardly and its lower portion rearwardly, thereby producing through the medium of the cables 36 and the equalizer 42 rearward and simultaneous movement of the arms 34 of the rock shafts 31. In the operation it is apparent that the members 32 on the shaft 31 between the ends 26 of the brake band will be rocked and that thus the said ends will be separated to such an extent as to cause the band and the lining to expand into frictional contact with the brake drum, thus checking or stopping the vehicle as the lever 43 and foot lever 49 are yieldingly connected together by means of the rod 47, and spring 53, it is manifest that yielding pressure will be afforded to the brake band 24 and that thus abrupt or too sudden stoppage of the front wheels will be obviated.

By my improvements it is evident that the application of the brakes will be at three points, that is, one point within the transmission casing and another point on each of the front wheels of the vehicle, and that by reason of the yielding pressure applied to the wheels compensation for the wear of the elements of the service brake mechanism within the transmission casing will be made.

Furthermore, a very important object attained by the novel arrangement disposition and use of the various elements of the present invention, particularly of the cables and pulleys thereof, is the absolute independence of the steering and brake mechanism, for it will be inderstood that as the point of contact between each cable and pulley is located axially with respect to but preferably above the pivot pins 10, the brakes can be applied at any time.

Having thus fully described my invention, what I claim as new and desire to secure by Letters Patent is:—

1. In a device of the class described, a wheel, a vertical pin upon which said wheel is pivoted, supports for said pin, a dust disc having a slot therein carried by said supports and capable of adjustment thereon, a brake drum carried by said wheel and an expansible brake band carried by said disc cooperating with said drum.

2. In a device of the class described, a wheel, a vertical pin upon which said wheel is pivoted, spaced supports for said pin, a connection between said supports, a dust disc having a slot therein and carrying an expansible brake band, a brake drum upon said wheel with which said band cooperates and a U-bolt connecting said dust disc with said connection between said supports whereby the dust disc may be adjusted with relation to said brake drum.

EDWARD L. KULICK.